SUBSCRIPTION TELEVISION SYSTEM

Filed April 15, 1953 5 Sheets-Sheet 1

GEORGE V. MORRIS
ERWIN M. ROSCHKE
*INVENTORS.*

BY Francis W. Crotty

THEIR ATTORNEY.

SUBSCRIPTION TELEVISION SYSTEM

Filed April 15, 1953 5 Sheets-Sheet 2

GEORGE V. MORRIS
ERWIN M. ROSCHKE
*INVENTORS.*

BY Francis W. Crotty

THEIR ATTORNEY.

GEORGE V. MORRIS
ERWIN M. ROSCHKE
*INVENTORS.*

BY Francis W. Crotty

THEIR ATTORNEY.

GEORGE V. MORRIS
ERWIN M. ROSCHKE
*INVENTORS.*

BY Francis W. Crotty

THEIR ATTORNEY.

GEORGE V. MORRIS
ERWIN M. ROSCHKE
*INVENTORS.*

BY Francis W. Crotty

THEIR ATTORNEY.

United States Patent Office 2,909,592
Patented Oct. 20, 1959

2,909,592

SUBSCRIPTION TELEVISION SYSTEM

George V. Morris, Chicago, and Erwin M. Roschke, Des Plaines, Ill., assignors to Zenith Radio Corporation, a corporation of Delaware Application April 15, 1953, Serial No. 349,076

10 Claims. (Cl. 178—5.1)

This invention relates to subscription television apparatus and more particularly to an improved method for providing coding and decoding information in such a system. Since the invention may be practiced in either a transmitter or receiver, the term "encoding" is used herein in its generic sense to encompass either coding at the transmitter or decoding at the receiver.

A number of subscription television systems have been proposed; usually they are characterized by the fact that the radiated television signal is coded in accordance with a coding schedule, which may be repetitive or random, and decoding information is made available to subscribers to control decoding apparatus in their receivers in order to permit utilization of the coded telecast. For example, in U.S. Patent No. 2,510,046 issued May 30, 1950, in the name of Alexander Ellett et al. and assigned to the present assignee, the decoding information or a key signal is preferably transmitted to subscriber receivers by a closed conductive network and a very high degree of secrecy is thus attained. The wire facilities which may be employed may, of course, be existing networks such as those of telephone and power utilities but such utilities must be compensated for the service rendered. Further, some owners of television receivers who may be desirous of utilizing the transmitted information from the subscription television station may be without telephone service or may be on power lines not accessible to the power system over which the key signal is to be disseminated from the subscription transmitter.

With those problems in mind inventions have been made, for example, as disclosed in application Serial No. 281,418, filed April 9, 1952, issued July 15, 1958, as Patent No. 2,843,646, in the name of George V. Morris et al. and assigned to the present assignee, directed towards disseminating the key information by an air-borne signal. This method of distribution presents the problem of preventing non-subscribers from extracting the decoding information from the air-borne signals and utilizing it in the unauthorized decoding of the subscription program. The ultimate goal in such systems, featuring air-borne distribution of decoding data, is maximum secrecy with a minimum of complexity in the transmitting and receiving equipment. That goal has been approached in the invention described and claimed in copending application Serial No. 326,107 filed in the name of Jack E. Bridges on December 15, 1952, issued February 11, 1958, as Patent No. 2,823,252, and assigned to the assignee of the present application. In the Bridges system, signals from a combination of a plurality of randomly energized signal generators having different operating frequencies is passed through a transposition mechanism for selective application to a series of input circuits of a bistable code actuator which establishes an operating mode in the transmitter determined by the applied signals. The transposition mechanism includes a plurality of switches which may be adjusted to any one of a number of operating positions to control the operating mode that a given combination of applied signals may otherwise impose on the transmitter. Complementary apparatus controls the actuator of the decoder in subscribers' receivers to which the same combination of signals, received as a radiation component during the subscription program, may be applied to effect decoding of the telecast which has been coded by the mode changes introduced at the transmitter. It is desirable from a merchandising standpoint to reduce the number of operations or adjustments to be performed by subscribers to minimize the possibilities of error which may cause the subscriber to miss the program which he desires to receive.

It is an object of this invention to provide a relatively simple but secure coded subscription television system.

It is a further object of this invention to provide a simple and convenient method for prescribing coding and decoding information in a subscription television system.

It is still another object of this invention to provide an easily merchandisable element which may be applied at subscription television transmitters and receivers for controlling the coding and decoding of the subscription television signal while posing to non-subscribers great difficulty in duplicating the element, thus providing a high degree of security for the subscription system.

In accordance with the present invention, a subscription television system comprises an encoding mechanism having a plurality of operating conditions each of which imposes a different operating mode upon the system and the mechanism is responsive to applied signals to shift from one such operating condition to another. There are means in the system for deriving at least one primary encoding signal and a transposer is coupled between the signal-deriving means and the encoding mechanism for determining the response of that mechanism to the primary signal. The transposer includes at least one primary element and at least one secondary element normally having a predetermined circuit relationship with respect to one another and establishing a preselected response of the encoding mechanism to the primary signal. A transposing element is removably disposed in functional relation with respect to the transposer and comprises circuit components coupled to the aforesaid primary and secondary elements to modify the circuit relationship therebetween so that the primary signal, as translated by the transposer to the encoding mechanism, establishes a preselected response of that mechanism to the applied signal.

The features of this invention which are believed to be novel are set forth with particularity in the appended claims. The organization and manner of operation of the invention itself, together with further objects and advantages thereof, may best be understood by reference to the following description taken in conjunction with the accompanying drawings, in which:

Figure 1:
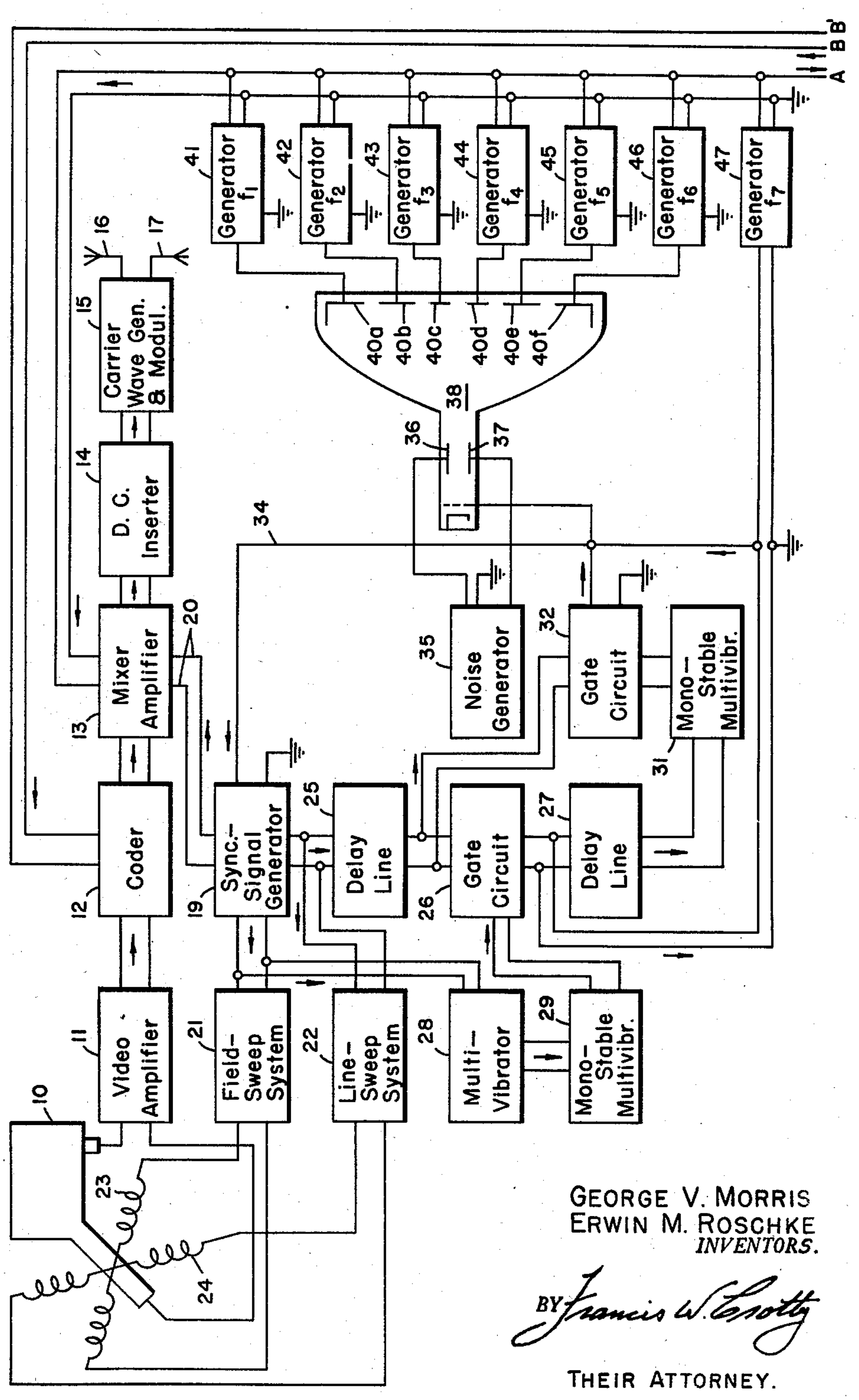
Figure 1 represents one portion of a subscription television transmitter constructed in accordance with the present invention.

In Figure 1 the output of an image-converter device 10, which may be of the conventional iconoscope or image orthicon type, is amplified in a video amplifier 11 in conventional fashion and fed through a coder 12 to a mixer-amplifier 13. Coder 12 may be, for example, similar to that disclosed and claimed in copending application Serial No. 243,039, filed August 22, 1951, issued August 7, 1956 as Patent 2,758,153 in the name of Robert Adler and assigned to the present assignee. Such a coder may include a beam-deflection tube having a pair of output circuits which may be coupled selectively to video amplifier 11 as the beam within the tube is deflected from one to the other of two segmental anodes coupled to such output circuits. One of these circuits includes a video-delay network so that the video components are delayed in time with respect to the synchronizing components radiated by the transmitter when the beam of the deflection tube is switched to the anode associated with that circuit. This switching effect is accomplished randomly by a signal derived in a fashion which will be described subsequently.

The output of mixer amplifier 13 is coupled through a direct-current inserter 14 to a carrier-wave generator and modulator 15, the output of which is radiated from antenna 16, 17.

The transmitter also includes a synchronizing-signal generator 19 which supplies line- and field-synchronizing components and associated pedestal components to mixer 13 through connecting leads 20. The output of generator 19 is also connected to a field-sweep system 21 and to a line-sweep system 22. The output terminals of field-sweep system 21 and line-sweep system 22 are connected to field-deflection elements 23 and line-deflection elements 24, respectively, associated with image-converting device 10.

In addition, generator 19 supplies field-drive pulses to a multivibrator 28 to produce an elongated pulse of a predetermined duration in response to each applied field-drive pulse. The output terminals of multivibrator 28 are connected to a monostable multivibrator 29 which is actuated from a normal operating condition to an abnormal operating condition in time coincidence with the trailing edge of the output pulse of multivibrator 28, to develop an output pulse of a predetermined time duration. The output pulse from multivibrator 29 is, in turn, applied as a gating signal to a normally-closed gate circuit 26.

Line-drive pulses from generator 19 are supplied to a delay line 25, the output terminals of which are connected to the input terminals of gate circuit 26 and, in addition, are connected to the input terminals of another normally-closed gate circuit 32. The output terminals of gate circuit 26 are connected directly to a generator 47. In addition, gate circuit 26 is coupled through a delay line 27 to another monostable multivibrator 31 and, by way of conductor 34, to synchronizing-signal generator 19. The output terminals of multivibrator 31 are connected to the input terminals of gate circuit 32 to provide a gating signal for that circuit. The output signal from gating circuit 32 is, in turn, applied to synchronizing-signal generator 19 over conductor 34. That conductor is also connected to the control grid of a beam-deflection device 38 to control the electron beam therein.

Beam-deflection device 38 includes a pair of deflection elements 36, 37 which are connected to the output terminals of a noise generator 35. The instantaneous signal amplitude obtained at the output of this noise generator varies in random fashion and, when applied to the deflection electrodes 36, 37, establishes a randomly alternating beam-deflection field within tube 38 having, at random times, an amplitude sufficient to sweep the electron beam, if existent at that instant, across a family of anode segments **40*a* through 40*f* at a rate corresponding to the instantaneous frequency of the noise signal from generator 35**.

The load circuits for the several segmental anodes **40*a* through 40*f* are completed through respective control circuits of a series of primary signal generators 41 through 46, respectively. The output signals from the respective anodes of beam-deflection device 38 activate associated ones of the primary signal generators in coincidence with the impingement of the electron beam in device 38 upon the associated anode segment. Each of the generators 41 through 47 is constructed in a fashion similar to that of a blocking oscillator so that the duration of its output after the application of each triggering signal is self-determined and is less than the time separation of successive line-synchronizing pulses. Moreover, each of the generators 41 through 47** has a distinctive predetermined operating frequency, as indicated by the indicia $f_1$ through $f_7$ applied thereto in Figure 1, to facilitate separation of the output of each generator from that of the others.

The respective areas of the segmented anodes of device 38 are designed so that each receives the same average current as the electron beam scans the anodes under the control of the noise signal applied to deflection elements 36, 37.

The output terminals of generators 41 through 47 are connected to a pair of input terminals of mixer-amplifier 13.

The bursts of energy at the various frequencies, constitute coding information and are impressed upon the radiated carrier wave through mixer 13. They are impressed as downward modulation on the vertical blanking pulse and occur between the line drive pulses.

Figure 2:
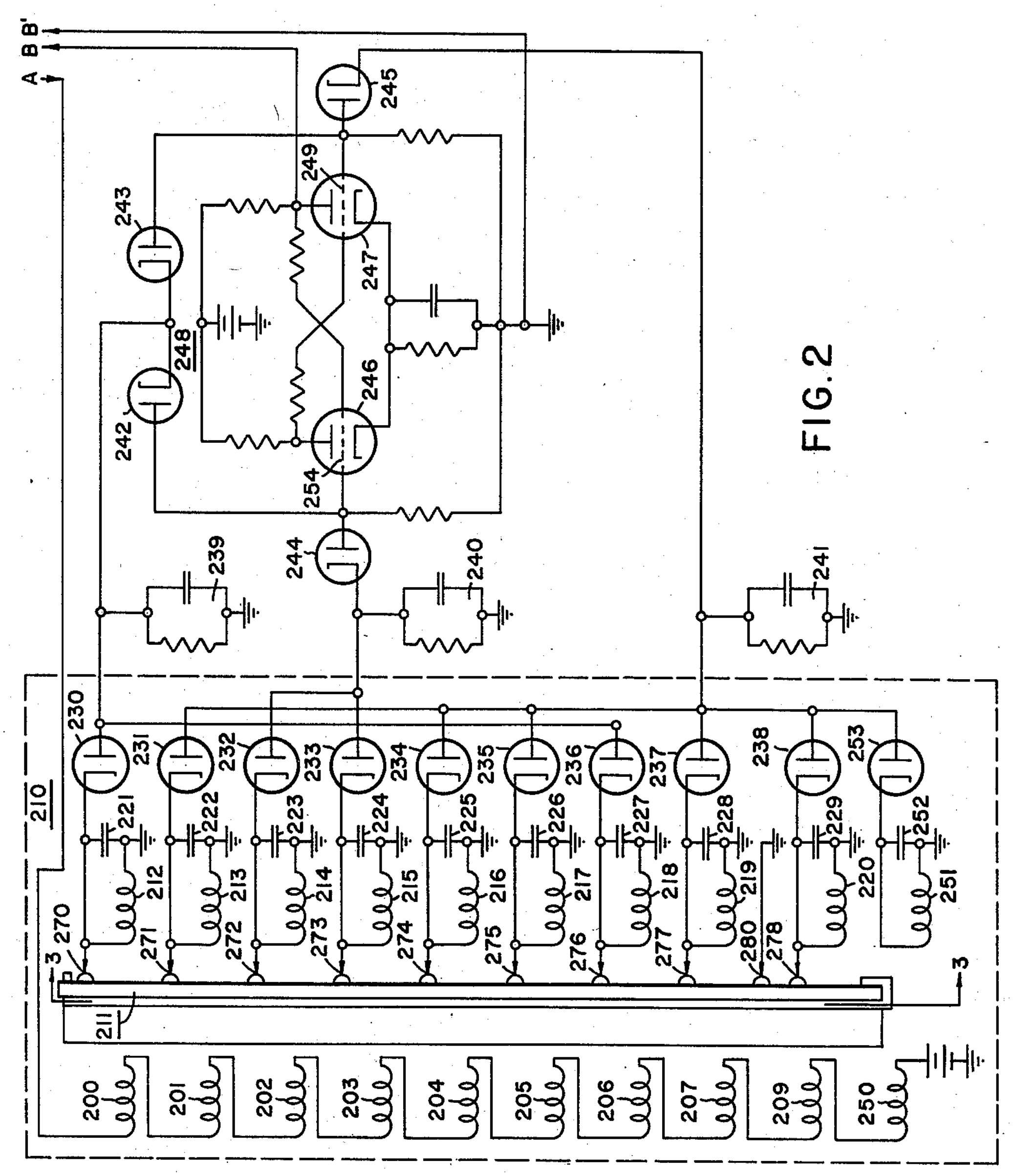
Figure 2 represents the remaining portion of that transmitter.

In addition the generators are coupled by means of a conductor A and a ground connection to the apparatus of Figure 2 and, in particular, to the primary input elements 200 through 209 and 250 of a transposer 210. In the absence of a physically removable transposing element or panel member 211, the primary input elements 200 through 209 and 250 are coupled to secondary input elements 212 through 220 and 251, respectively. The secondary input elements are tuned by condensers 221 through 229 and 252, respectively to predetermined frequencies, certain of which may differ by known amounts from the operating frequencies $f_1$ through $f_7$ of the primary signal generators. The output signals from the secondary input elements are rectified by diodes 230—238 and 253, and such rectified signals are coupled to preselected ones of three load circuits 239, 240 and 241. The output signals from these load circuits are coupled through unidirectional control diodes 242, 243, 244, and 245 to the control grids of two electron-discharge devices 246 and 247 connected as a controlled bistable multivibrator 248. The anode of electron-discharge device 247 is connected through conductor B and ground line B′ to coder 12 of Figure 1 to apply a deflection-control signal thereto and effect actuation of that coder.

Coding is effected in the following manner: Periodic line-drive pulses are supplied to delay line 25 to produce delayed line-drive pulses. The amount of delay introduced is greater than the duration of a line-drive pulse but substantially less than the time separation of successive ones of such pulses. Moreover, periodically recurring field-drive pulses are applied to multivibrator 28. The leading edge of an applied field-drive pulse actuates the multivibrator from its normal or first operating condition to its abnormal or second operating condition and, after a selected time interval determined by its internal cycling circuits, the circuit returns to its first condition producing a pulse of energy. The parameters of the multivibrator are so chosen that the trailing edge of this pulse occurs during the field-retrace time of the system, at a point following the equalizing pulses which succeed the serrated field-drive pulse in present-day practice. This pulse is applied to mono-stable multivibrator 29 which responds to the trailing edge thereof and produces a gating pulse. The parameters of multivibrator 29 are so chosen that the gating pulse overlaps, in point of time, one pulse from delay line 25. Gate circuit 26 receives the gating pulse as well as delayed line-drive pulses from delay line 25 and responds to their coincident effect to translate a delayed line-drive pulse to generator 47. This generator is energized by the applied pulse and develops a burst of signal of frequency $f_7$ having a time duration exceeding the duration of the actuating pulse but less than the time separation of successive line-synchronizing pulses. This signal burst of frequency $f_7$ produced at the output terminals of unit 47 is for reset purposes to be considered more particularly hereinafter.

The output signal from gate circuit 26 is further delayed in delay line 27 which is terminated in its characteristic impedance and which exhibits such a delay that its output pulse follows the trailing edge of the pulse supplied to generator 47. The delayed output pulse is applied to mono-stable multivibrator 31, producing a gating pulse for gate circuit 32. The parameters of multivibrator 31 are so chosen that its output pulse overlaps, in point of time, the number of delayed line-drive pulses to be employed in coding—six for the case in question. Delayed line-drive pulses are continuously supplied from delay line 25 to gate circuit 32 and those which occur within the duration of the gating pulse are translated to the input electrodes of beam-deflection device 38. These translated pulses intensity modulate the beam, gating it on for the duration of each such pulse. At the same time, the variable amplitude sweep signal impressed on deflection elements 36, 37 by noise generator 35 creates a deflection field varying at a random rate to scan the beam back and forth across segmental anodes **40*a*—40*f*. If the electron-beam happens to impinge on an anode segment at the instant a gated pulse is applied to the control electrode, a pulse of current flows in the circuit of that segmental anode to turn on the one of generators 41—46 that is coupled thereto. For purposes of illustration it will be assumed that at the time of the first pulse the beam is incident upon anode 40*c* and thus generator 43 produces a burst of signal of frequency $f_3$. It will further be assumed that as succeeding pulses occur, generators 42, 46, 41, 44 and 42**, are "turned on" in the recited order, producing corresponding bursts of signal at frequencies $f_2$, $f_6$, $f_1$, $f_4$ and $f_2$. A code combination comprising a series of random but sequential primary signal of various frequencies is thus generated.

These primary signals are impressed on primary input elements 200 through 209 and 250 of transposer 210. For effective transfer of energy from the primary input elements to the secondary input elements the resonant frequency of at least one of the secondary elements and its shunting capacitance must correspond at least approximately to the frequency of a burst of energy from signal generators 41—47. Each secondary element may be tuned to the operating frequency of one of the generators, even in the absence of panel member or transposing element 211. Alternatively, in the absence of transposing element 211 selected ones of the secondary elements may be tuned to a frequency higher than the highest frequency appearing in the aforementioned combination of bursts of energy. One function which may then be performed by the insertion of transposing element 211 into coupling relation with the secondary elements is the addition of capacitance in shunt relation to existing capacitance of a chosen secondary element, with a resultant reduction in the resonant frequency of that circuit to one of the preselected frequencies appearing in the combination of energy bursts delivered by signal generators. The exact fashion in which this is accomplished will be explained in detail in connection with Figure 3.

The operating condition in which transposing element 211 is not functionally inserted between the primary elements and the secondary elements of unit 210 may be considered for the moment as "the normal condition." For the purpose of analysing the operation of the transposing and coding circuits under this condition the following assumptions will be made. The resonant frequency of secondary element 212—221 exceeds the highest signal frequency of the combination of signals supplied by the primary signal generators. The secondary element 213—222 is resonant at frequency $f_2$; secondary element 214—223 is resonant at frequency $f_3$; secondary element 215—224 is resonant at frequency $f_4$; secondary element 216—225 is resonant at frequency $f_4$; secondary element 217—226 is resonant at frequency $f_5$; secondary element 218—227 is resonant at frequency $f_5$; secondary element 219—228 is resonant at frequency $f_6$; secondary element 220—229 is resonant at frequency $f_3$; and secondary element 251—252 is resonant at frequency $f_7$. It will be further assumed that the priamry signal generators 41—47 are actuated by pulses from beam-deflection device 38 to generate the following combination of primary signal frequencies: $f_7$, $f_3$, $f_2$, $f_4$, $f_5$, $f_6$ and $f_1$. Also, consider that in the reference operating condition of multivibrator 248, electron-discharge device 247 is non-conductive while tube device 246 is highly conductive; and further that at the beginning of the combination of signal frequencies the multivibrator is in its alternate stable condition in which only tube 247 is conductive. The initial burst of energy of frequency $f_7$, after selection by selector 251—252 and rectification by diode 253, produces a negative pulse at grid 249 of electron-discharge device 247 and biases it to cut-off, thus switching electron-discharge device 246 to a conductive condition. This returns the apparatus to its reference operating condition. Had the multivibrator been in its reference condition on the occurrence of the frequency burst $f_7$ the pulse applied to grid 249 would have had no effect. Consequently, the code actuating mechanism 248 is certain to be placed in a reference condition at the beginning of each combination of primary signal pulses introduced by the burst of signal frequency $f_7$ and the period in which the combination occurs may, for convenience, be called a mode-determining interval.

The burst of signal frequency $f_3$, which for the illustrative example under consideration follows immediately upon the reset frequency burst $f_7$, is selected by selector 214—223 and rectified by diode 232 to produce negative pulses simultaneously on grid 254 and grid 249 of electron-discharge devices 246 and 247, respectively. These pulses cut off electron-discharge device 246 and cause device 247 to be conductive thus shifting multivibrator 248 to its alternate operating condition. While the burst of signal frequency $f_3$ is also selected at secondary 220—229 and rectified by diode 238 to apply a negative pulse to grid 249 of tube 247, its effect may be neglected since that tube is cut off at the time the pulse is applied. The next burst of signal frequency $f_2$ is separated by selector 213—222 and rectified in diode 231 producing a negative pulse on grid 249 of electron-discharge device 247. Thus tube 247 becomes non-conductive and tube 246 becomes conductive; in other words the multivibrator shifts to its reference condition. The succeeding burst of signal frequency $f_4$ is selected by selectors 215—224 and 216—225, rectified by diodes 233 and 234 and produces negative pulses both grids 254 and 249 with the effect of switching on electron-discharge device 247, switching off electron-discharge device 246 and shifting circuit 248 to its alternate operating condition. When the burst of signal frequency $f_5$ occurs it is selected by secondaries 217—226 and 218—227 and rectified by diodes 235 and 236. The significant control pulse which results is a negative pulse at grid 249 of electron-discharge device 247. This returns the multivibrator once again to its reference condition. When the burst of signal frequency $f_6$ occurs it is selected by secondary 219—228 and rectified by diode 237 and appears as a negative pulse at grid 249 of electron-discharge device 247 but has no effect upon the multivibrator because that electron-discharge device is already in a cut-off condition. The final burst of signal frequency $f_1$ of the combination under consideration likewise has no effect upon the system because none of the secondary selectors is resonant at this frequency for the assumed conditions.

Thus, the combination of primary signals, insofar as it includes components to be selected by the tuned secondaries of the transposer 210, shifts multivibrator 248 from one to the other of its operating conditions within the mode-determining interval. In this fashion, a deflection-control signal is developed in the output circuit of tube 247 and is applied over conductors B, B′ to coder 12 of Figure 1. This signal has a maximum amplitude when tube 247 is nonconductive and a minimum amplitude when that tube conducts. It shifts between such amplitude levels as the multivibrator is switched from one to the other of its stable operating conditions. The resulting amplitude excursions of the deflection-control signal deflect the beam within coder 12 between its two possible positions and thus shift the operating mode of the transmitter between its two corresponding modes. The operating mode established at the end of the mode-determining interval prevails until the start of the next such interval in which the mode may be changed again. The system as thus far described, except for the particulars of transposer 210 is disclosed and claimed in application Serial No. 326,107 filed December 15, 1952, in the name of Jack E. Bridges and assigned to the present assignee.

Figure 3:
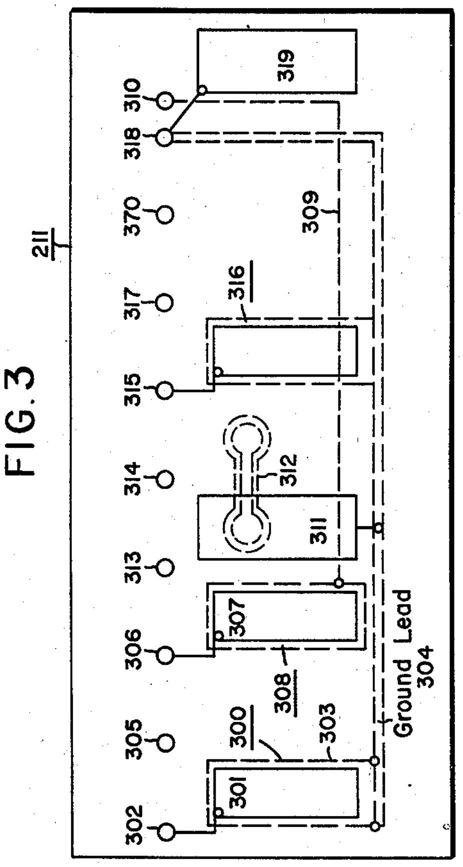
Figure 3 represents a transposing element in accordance with the present invention.

In accordance with one feature of the present invention, the displaceable component 211 of transposer 210 may be functionally inserted into coupling relation with the primary and/or secondary elements to vary the effect a combination of primary signals, applied during any mode-determining interval, may otherwise have on the mode changes of the system. More particularly, panel member 211 by changing the coupling relationship between the primary input elements and the secondary input elements or by changing the resonant frequency of one or more of the secondary selectors may vary the effect of a burst of energy of a particular frequency on the operating condition of multivibrator 248 and the operating mode of the system. In Figure 3 there is represented schematically a transposing element 211 for altering the circuit relationship between the primary elements and the secondary elements of unit 210 and for transposing the bursts of primary signal energy from the standpoint of their selective application to the several input circuits of multivibrator 248. As illustrated, transposing element 211 comprises a printed condenser 300 having one electrode 301 connected to a terminal 302 and another electrode 303, printed on the opposite side of a supporting member of dielectric material and coupled to a ground lead 304. Terminals 305, 313, 314, 317 and 370 may, in this embodiment, be dummies. Terminal 306 may connect to one electrode 307 of a second condenser 308, the opposite electrode of which is connected by means of conductive strip 309 to a terminal 310. A shielding element 311, which is grounded, may be provided on one side of the support member while on the opposite side thereof a coupling link 312 may be printed; its contour and physical position on the support are so chosen that when the transposer is in its operating position this link overlaps adjacent and preselected primary input elements. Terminal 315 connects to one electrode of still another condenser 316 having its other electrode grounded. Ground strip 304 is connected to terminal 318 and a shielding element 319 is placed adjacent terminal 310 and grounded to terminal 318. While the components on transposing element 211 have been described as printed they may be the conventional variety. A top and/or bottom cover of insulating material (not shown) may be placed over the described structure to form a laminated component on the outer surface of which appear only terminals corresponding to terminals 302 through 318 and 370. Of course, the parts of this structure may, if desired, be printed on a high dielectric sub-base which is then encased in some insulating material.

When the described transposing element 211 is functionally inserted into unit 210 of Figure 2 terminals 302, 305, 306, 313, 314, 315, 317, 370 and 310 engage contacts 270 through 278, respectively while terminal 318 engages contact 280. The condenser 300 of element 211 has such a capacitance that when it shunts condenser 221 through mating contacts 302—270 and 318—280 the secondary element comprising inductor 212 resonates at frequency $f_1$. Mating contacts 306—272 and 310—278 connect coupling condenser 307 between the high potential terminals of secondary element 214—223 and secondary element 220—229. At the same time, primary input element 209 is isolated or shielded from secondary element 220—229 by shield 319 of transposing element 211. Moreover, coupling link 312 of the transposing element inductively couples secondary element 215—224 to secondary element 216—225 while shield 311 prevents energy in primary input element 203 from being coupled to secondary element 215—224. Mating contacts 315—275 and 318—280 connect condenser 316 in shunt relation to condenser 226 and change the tuning of the secondary element comprising inductor 217 from normal frequency $f_5$ to frequency $f_4$. No other circuit transpositions are effected upon the insertion of the element of Figure 3 into functional relation with transposer 310.

With transposing element 211 in operating position the effect of the aforementioned combination of bursts of signal energy delivered by signal generators 41 through 47 (namely, signal frequencies in the order $f_7$, $f_3$, $f_2$, $f_4$, $f_5$, $f_6$ and $f_1$) is as follows. Multivibrator 248, if it is not in its reference condition at the start of the combination is reset in response to the burst of signal frequency $f_7$ in the fashion previously described. The burst of signal frequency $f_3$ is selected by secondary 214—223, rectified in diode 232 and impressed with negative polarity upon grid 254 of electron-discharge device 246. Simultaneously, by reason of the capacitive coupling through condenser 308 carried by element 211 the signal burst also appears across secondary element 220—229 even though that element is shielded from its associated primary 209 by shield 319 of device 211. The signal is rectified by diode 238 and produces a negative pulse on the grid 249 of electron-discharge device 247. The pulses thus produced cause a switching action in the multivibrator; electron-discharge device 247 becomes conductive while device 246 is cut off. The next burst of signal energy occurs at frequency $f_2$. It is selected by secondary 213—222 and rectified by diode 231 which produces a negative pulse at the grid 249 of electron-discharge device 247, thus cutting off that tube and returning the multivibrator to its initial or reference condition.

The following burst of signal energy occurs at frequency $f_4$ and is selected by secondary element 216—226. The coupling link 312 couples this energy into secondary 215—224 which is otherwise shielded from its primary element 203 by shield 311 of device 211. Consequently, rectified pulses appear at the output of both diodes 233 and 234 and hence on both grids 254 and 249 of the electron-discharge devices in multivibrator 248 simultaneously. At the same time secondary element 217—226 selects the burst of signal energy which is then rectified in diode 235. The overall effect of these pulses thus applied to the input circuits of tubes 246 and 247 is to switch the multivibrator once more from its reference to its alternate operating condition.

The next burst of signal energy occurs at frequency $f_5$ and is selected by secondary element 218—227. It is rectified by diode 236 and appears at both grids 254 and 249 to trigger the multivibrator from its instantaneous condition to its alternate condition. Then a burst of signal energy at frequency $f_6$ is selected by secondary element 219—228, is rectified by diode 237 and develops a negative pulse on grid 249 of electron-discharge device 247. This signal has no effect on the multivibrator since device 247 is already in its non-conductive state. The burst of signal energy of frequency $f_1$ is selected by secondary element 212—221, rectified by diode 230, and applied to grids 254 and 249 of the multivibrator which is switched thereby to its operating condition in which electron-discharge device 246 is non-conducting and electron-discharge device 247 is conducting.

Thus, it may be seen that the introduction of transposing element 211 into functional relation within unit 210 causes the illustrative combination of primary signals to have a different effect on multivibrator 248 than otherwise. This results in a modification of the deflection control signal delivered to coder 12 and changes the coding pattern of the transmitter. More particularly, panel member 211 by adding reactive impedances into selected ones of the secondary elements and/or by changing the coupling relation between them modifies the effect a burst of signal energy of any particular frequency may have on the system. The transposing element 211 is freely replaceable and facilitates the changing of code patterns from time to time to minimize the possibility of unauthorized appropriation of the subscription television program. Elements 211 may be distributed to subscribers in any convenient manner as by mailing, by vending machines or through distribution centers.

The arrangement under consideration is very flexible in that any of a number of circuit transpositions is possible, depending upon the construction of transposing element 211. A secondary element may be tuned to a lower frequency by adding capacitance thereto, may be capacitively coupled to another secondary element by a coupling condenser carried on the transposing element, may be inductively coupled to another secondary element by means of a coupling loop included in the transposing element, or may be shielded from its primary input element by a shield carried in the transposer. Of course, the resonant frequency of a secondary element may be increased, as by providing on the transposing element a short circuited single turn which may take the form of a simple sheet of conductive material. These transposing elements may be changed in makeup from week to week to provide maximum security for the system.

Figure 4:
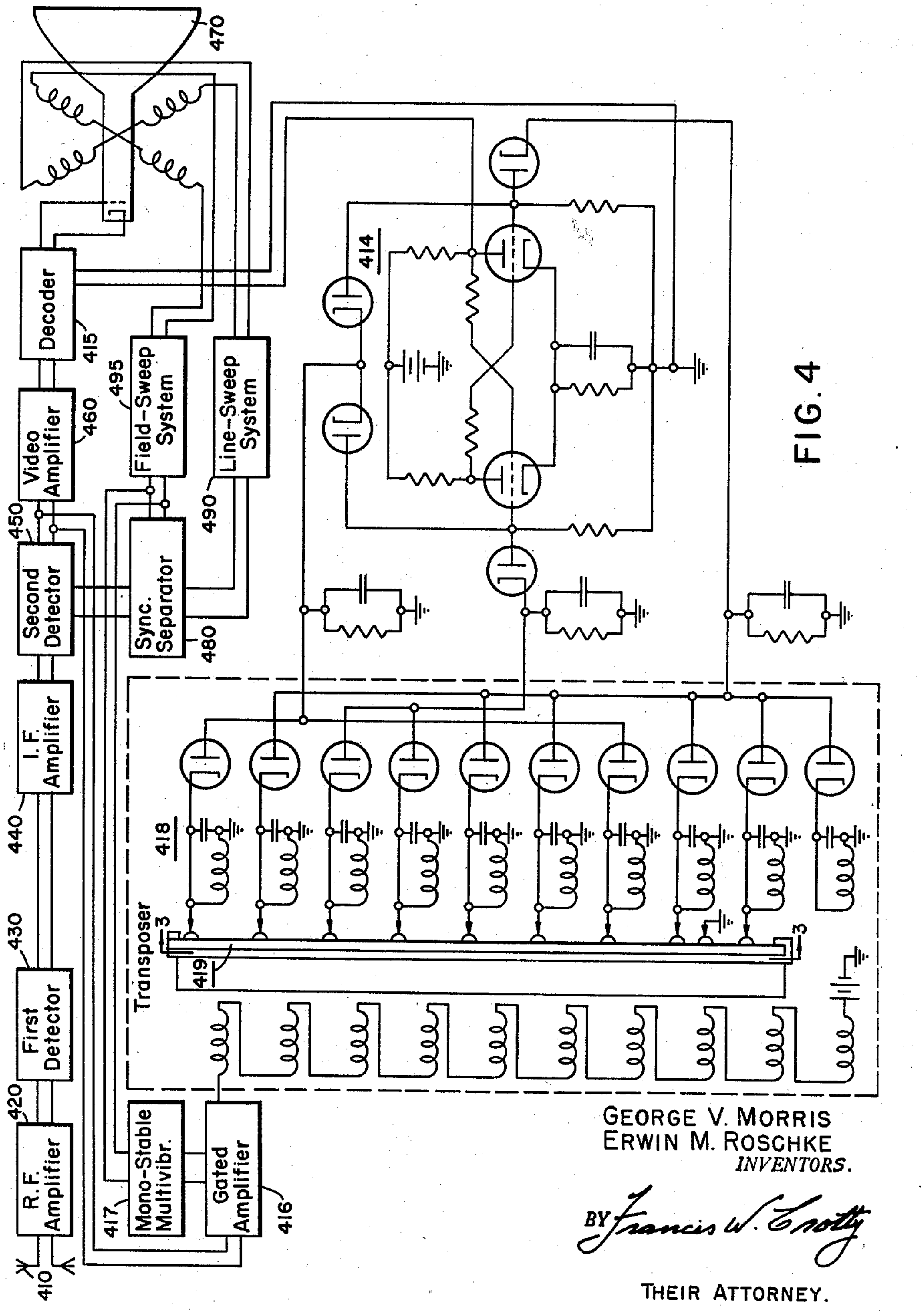
Figure 4 represents a receiver embodying the present invention.

In Figure 4 there is represented a subscriber receiver embodying the present invention and suited for utilizing the subscription telecast originating at the transmitter of Figures 1 and 2. It comprises an antenna 410 coupled to the input circuit of a radio-frequency amplifier 420. The receiver further comprises a first detector 430, an intermediate-frequency amplifier 440, a second detector 450, a video amplifier 460, an image reproducer 470, a synchronizing-signal separator 480, a horizontal sweep system 490 and a vertical sweep system 495. The components are of well-known construction and operate in conventional manner in the reproduction of an image. A decoder 415, similar to coder 12 of the trasmitter of Figure 1, is included between the video amplifier and image reproducer. It is actuated in response to a deflection-control signal from a bistable multivibrator 414 which corresponds to multivibrator 248 of Figure 1 although the actuation of decoder 415 is in an oppposite sense to that of coder 12 at the transmitter. This results in compensation of the coding produced at the transmitter and the reproduction of an image on kinescope 470.

The bursts of signal energy at frequencies $f_1$ through $f_7$, employed for coding purposes at the transmitter and radiated along with the subscription telecast, are removed from the vertical blanking pulse of the received signal by a gated amplifier 416 which is coupled to second detector 450. The gating signal for activating amplifier 416 is derived from a mono-stable multivibrator 417, which is controlled by vertical synchronizing pulses from separator 480. The signal bursts so removed are applied to the primary input elements of a transposer 418, which is substantially identical with transposer 210 of Figure 2 and arranged to accommodate a replaceable transposing element 419 substantially identical with transposing element 211 employed at the transmitter. If replaceable transposing element 419 be neglected for the moment, this receiver is the same in all material respects as the receiver of the aforementioned Bridges application and, assuming the replaceable element 211 is not employed in the transmitter, it functions in a generally similar manner to develop a deflection-control signal for application to decoder 415. When the replaceable transposer is taken into consideration, the receiver operation is modified in precisely the same manner as the insertion of the corresponding replaceable element modifies the coding schedule or pattern of the transmitter of Figure 1 hereof. Consequently, the combination of signal bursts of frequencies $f_1$ to $f_7$ controls bistable multivibrator 414 to develop a deflection-control signal which actuates decoder 415 in a complementary sense to the actuation of coder 12 at the transmitter as required to decode the telecast and effect image reproduction on the screen of kinescope 470.

Figure 5:
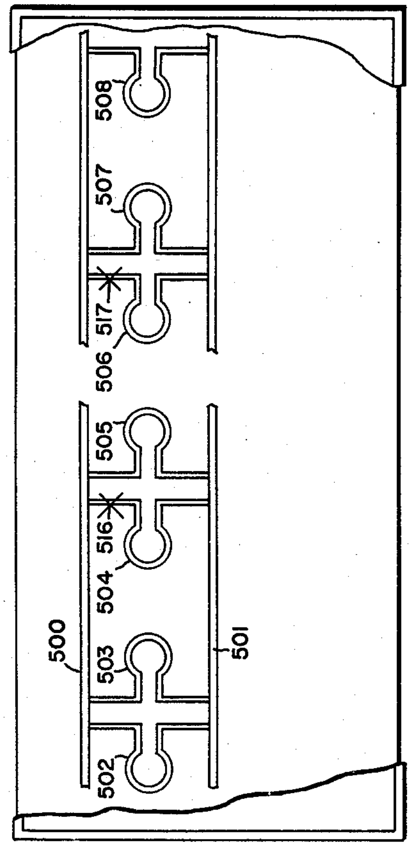
Figure 5 represents another embodiment of the transposing element.

It may be particularly desirable in practicing the present invention to construct the replaceable transposing element of the transposer units in such manner that it has no external terminals which may be significant to unauthorized persons attempting to decipher the electrical specifications of the replaceable element. A construction of the element employing no external terminals is represented in Figure 5 where, for convenience of illustration, the exterior covering has been broken away to reveal the circuitry of the device. In this form, the device comprises a supporting card or strip of insulating material upon which is imprinted two elongated conductors 500 and 501. A series of coupling loops 502—508 are abridged between these conductors; the number of loops employed is dictated by the particular arrangement of the transposer with which the replaceable element is to be employed. For that reason, conductors 500 and 501 have been represented as discontinuous to indicate that there may be more loops interposed between the conductors than actually represented in the drawing. The space relation of the loops along the insulating support is determined by the space relation of the secondary elements of the transposer with which the card is to be associated. When the element of Figure 5 is functionally inserted into a transposing unit, such as unit 210 of Figure 2, the series of conductive loops supported by that element are to have such relation to the secondaries of unit 210 as required for effective coupling of each loop to the inductor of an assigned secondary element of unit 210.

This embodiment of the replaceable transposing element is most effective when the transposer unit employs a single primary input element, such as that designated 200 in Figure 2, in addition to the primary element 250 utilized for reset purposes. The other primaries 201–209, inclusive, are omitted and, preferably, primary 200 is shielded or otherwise decoupled from the series of secondaries. When the replaceable element is functionally introduced into such a transposing unit, the first coupling loop 502 is inductively coupled with the primary input 200 and the transfer of signal energy to the secondary elements is under the control of the circuitry of the replaceable element. Where any succeeding coupling loop of the replaceable element, such as loop 503, is conductively connected with conductors 500—501 signal energy introduced into the first coupling loop 502 from primary 200 is translated through the closed circuit including loops 502 and 503. As a consequence, this signal energy is then transferred inductively from coupling loop 503 to its associated secondary, for example secondary 213—222 of Figure 2. Energy transfer in similar fashion occurs to all of the secondaries for which the associated coupling loop on the replaceable element is effectively in circuit with the loop 502 driven by the primary input 200. For the case illustrated, this circuit condition exists for loops 503, 505, 507 and 508.

Where any loop of the replaceable element is effectively disassociated circuitwise from conductors 500 and 501, there is no coupling through that loop to its associated secondary element and, therefore, no transfer of energy takes place from the primary 200 to such secondary. In the arrangement illustrated, loops 504 and 506 are represented schematically at points 516 and 517 as electrically disassociated with conductor strips 500 and 501. This may be accomplished, of course, by omitting or breaking the connector which otherwise is employed to complete the connection from those conductors to the coupling loop, or alternatively, the loops themselves may be omitted in the construction of the replaceable transposing element.

This transposing element is difficult to pirate because the circuit components thereof are completely encased within a laminated structure which presents no terminal information. The transposing unit is subjected to circuit modifications by the introduction of this replaceable element into functional relation therewith; the replaceable element determines which of the secondary elements of the transposing unit is effectively coupled to the driver primary element 200 and the effectiveness of the coupling is selectively controlled by the tuning or selective properties of the secondaries. The response of the bistable multivibrator included within the transposing unit to a combination of signal pulses of different frequencies applied to primary 200 is generally similar to that described in connection with the operation of the device represented in Figures 1, 2 and 3, differing primarily in the manner in which signal energy is transferred from the single primary to the series of secondaries.

In certain embodiments of the present invention, the replaceable element of the transposing unit may advantageously be employed in a system wherein the code information is represented, at least in part, by combinations of bursts of signal energy subject, from time to time, to frequency modulation. The additional step of introducing frequency modulation in respect of the combination of primary signals makes it difficult for unauthorized persons to appropriate the subscription telecast by breaking the code that has been employed. An arrangement of the type under consideration is represented in Figure 6 which shows, schematically and in modified form, only so much of the transmitter of Figures 1 and 2 as concerns the generation of the combination of primary signals and the application of those signals to input terminals of the bi-stable multivibrator which develops the deflection-control signal for the coding device 12.

More specifically, a noise generator 600 develops a balanced deflection signal for deflection electrodes 601 and 602 of a deflection tube 603. This tube is represented as having only three segmental anodes 604*a*, 604*b* and 604*c* although the number to be employed is, of course, determined by the number of signal components to be included in the combination of primary signals utilized in a mode-determining interval to ascertain the operating mode to be imposed on the transmitter until the occurrence of the next such interval. Each anode segment is coupled to an assigned one of the primary signal generators 605, 606 and 607 through a modulating device here represented as reactance tubes 605*a*, 606*a* and 607*a*. It is preferred that each reactance tube arrangement include its own cycling circuit so that a current pulse applied to the modulating device from its assigned anode segment of deflection tube 603 renders the reactance tube effective for a pulse interval which at least corresponds to the pulse intervals of the individual primary signal generators.

The pulsed operation of the primary signal generators is under the control of a similar deflection tube 603*a* to which a deflection control signal is applied from a second noise generator 600*a*. The anode segments of this last-mentioned deflection tube are directly coupled to the cycling circuits of the primary signal generators in the manner of Figure 1.

Figures 6, 7:
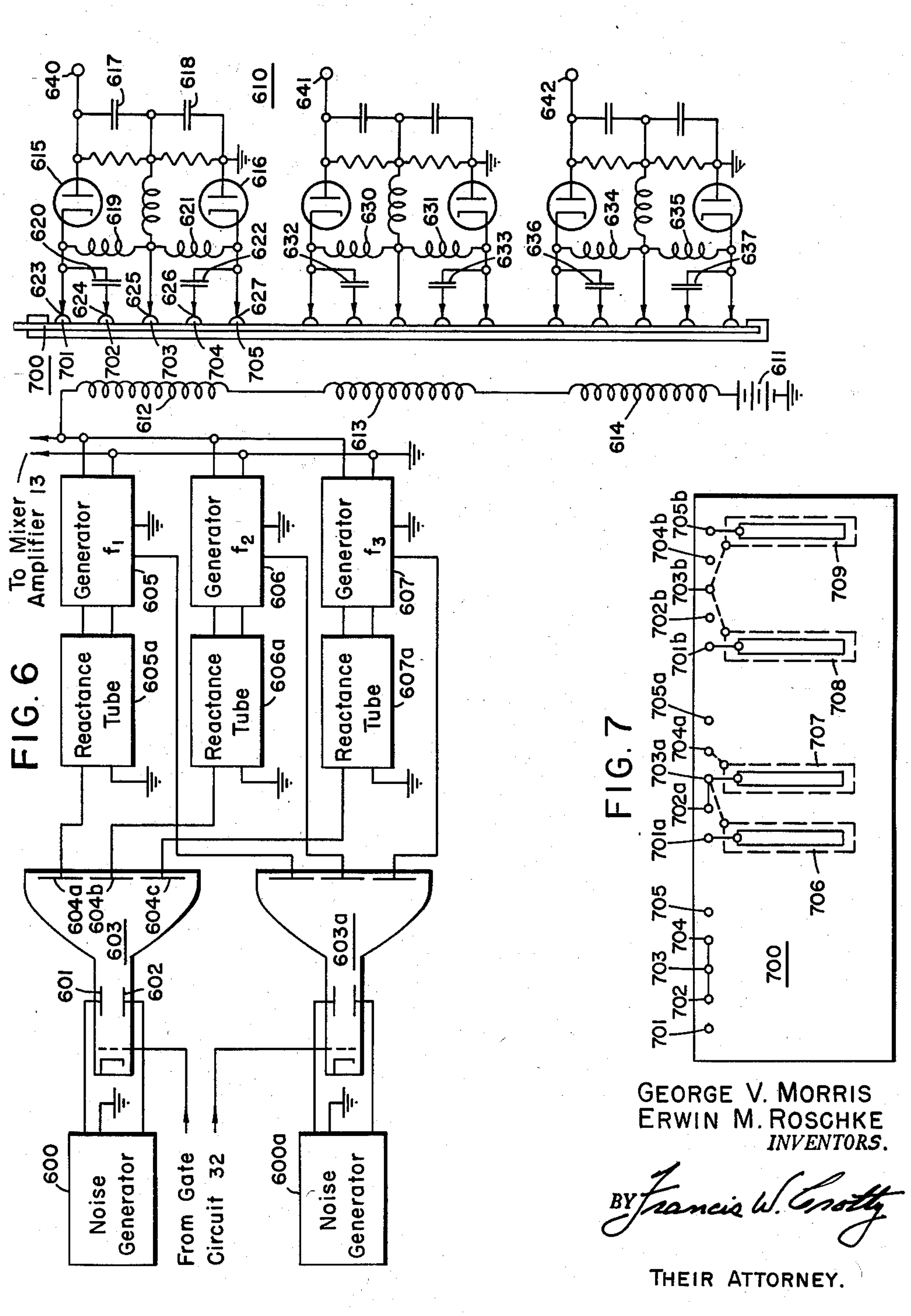
Figure 6 represents a further modification of a portion of the transmitter of Figures 1 and 2.
Figure 7 represents a transposing element which may be used in connection with the arrangement of Figure 6.

In the embodiment of Figure 6, the output circuits of the primary signal generators are coupled to the transposer unit 610, the output circuits of such generators being connected to a source of operating potential, represented as a battery 611, through series-connected primary elements 612, 613 and 614. The secondary elements of the transposer are grouped in pairs to constitute a multiplicity of frequency modulation discriminator-detectors for responding to the frequency modulation imposed on the primary signals. Three such detectors have been represented since the transmitter, for the case in question, has been shown as including only three primary signal generators.

The first such detector includes the usual pair of diodes 615 and 616 having resistance-capacitance load circuits 617 and 618. The circuit of one diode, when conditioned for detection, is tuned to a frequency which is higher than a reference or nominal frequency by some incremental value whereas the circuit of the other diode, for the same conditions, is tuned to a lower value than the mean frequency by the same increment. This tuning may be accomplished for diode 615 by means of an inductor 619 and capacitive reactance including a condenser 620; the corresponding components of the circuit of the alternate diode 616 are designated 621 and 622. The circuit connections of the condensers 620 and 622 with respect to the secondary inductors 619 and 621 are to be completed, if at all, through mating contacts of the detector circuit and of a replaceable transposing element 700. There are five contact pairs for each detector.

The stationary contacts, which are permanently integrated in the detector circuit, are as follows:

Contact 623 which is connected to the junction of one terminal of condenser 620 and one terminal of inductor 619; contact 624 which connects to the opposite terminal of condenser 620; contact 625 connected to the junction of inductors 619 and 621; contact 626 connected to one terminal of condenser 622; and contact 627 connected to the alternate terminal of the condenser and its junction with inductor 621. The mating contacts, which mate with the stationary ones in the order recited, are designated 701–705, inclusive, and they are carried by the replaceable element 700 to be considered more particularly presently.

The second detector circuit includes inductors 630 and 631 as well as tuning condensers 632 and 633 which are connected to the same arrangement of stationary contacts. And the third detector comprises inductors 634 and 635 as well as tuning condensers 636 and 637 also connected to the same arrangement of stationary contacts. The tuned input circuits of the several detectors can be completed by the circuitry of the replaceable element 700 which may provide for a variety of circuit connections as indicated in Figure 7.

In that figure it is apparent that the replaceable element has as many groups of contacts as there are detectors, three for the specific embodiment represented. Each such group comprises five contacts 700—705. In the first contact group, the middle three contacts are conductively connected in series and no connections are made to the end contacts.

The next contact group of replaceable element 700 has been designated by the reference characters 701*a*–705*a*, inclusive. Associated with the contacts of this group are a pair of condensers 706 and 707 which are printed on replaceable element 700. The mechanics of constructing the condensers on the element are well understood; in general, the replaceable element may comprise a supporting member of insulating dielectric material and one electrode of each condenser is printed on one side of the dielectric while the opposite electrode of each condenser is printed on the other side in space relation to its companion electrode. One electrode of condenser 706 is connected to contact 701*a* and its other electrode is connected to contact 703*a*. One electrode of condenser 707 is connected to contact 703*a* and its other electrode is connected to contact 704*a*. Contacts 702*a* and 703*a* are conductively connected while contact 705*a* serves as a dummy.

The final contact group, represented by reference numerals 701*b*—705*b*, inclusive, shows still a further arrangement for completing the input circuits of the FM detectors. This also involves the use of printed condensers 708 and 709 carried on the replaceable element 700. One electrode of condenser 708 is connected with contact 701*b*, its other electrode being connected to contact 703*b*. One electrode of condenser 709 is connected to contact 705*b* and its other electrode is connected to contact 703*b*. Contacts 702*b* and 704*b* may be considered as dummies.

The modified structure of Figure 6 may be incorporated into the transmitter of Figures 1 and 2 in place of the noise generator 35, deflection tube 38, primary generators 41—47 and transposer 210. When the substitution is made, the control electrodes of deflection tubes 603 and 603*a* of Figure 6 are connected to the output terminals of gate circuit 32; the output terminals of primary generators 605—607 which terminate in the arrows of Figure 6 are connected to mixer amplifier 13; the output terminals 640, 641 and 642 of transposer 610 may be connected, respectively, to the junction of the cathodes of diodes 242 and 243 of Figure 2, to the cathode of diode 244 and to the cathode of diode 245 so that the bi-stable multivibrator 240 is actuated by the modified transposer 610 in place of transposer 210 of Figure 2 to develop a deflection-control signal for application to coder 12.

In operating the modified structure of Figure 6, the nominal operating frequencies of primary generators 605—607 are chosen so that there is no interference or overlapping of the significant frequency range of any such primary generator with any of the others of the group. This merely requires adequate separation of their operating frequencies. The effect of deflection control tube 603*a* in energizing the primary signal generators in a random sequence is precisely as described in connection with the arrangement of Figure 1 so that in any mode-determining interval any such generator may be energized and the order of their energization may be changed in random manner under control of noise generator 600*a*. In like fashion, deflection control tube 603 in conjunction with noise generator 600 keys the reactance tubes 605*a* to 607*a* in random manner so that any particular reactance tube may or may not be energized in any given mode-determining interval.

As a consequence, in any such mode-determining interval there may be a combination of primary signals developed by generators 605—607. If in a particular interval, generator 605 is operated and if its reactance tube 605*a* has not been energized at the same time, the burst of signal energy for the particular instant is of the frequency $f_1$, the nominal operating frequency of the generator. On the other hand, should the reactance tube be concurrently energized, the burst of signal energy is then at a frequency $f_1$ plus $\Delta f$ or $f_1$ minus $\Delta f$, where $\Delta f$ is a change in frequency imposed by the reactance tube in a sense to increase and decrease the nominal frequency $f_1$ in accordance with the characteristics of the reactance tube and the sense of the reactance which it simulates, as is well understood in the art. Hence, in each mode-determining interval a combination of primary signals may be generated variously representing the mean operating frequency of the primary generators or such frequencies modified by the effects of the reactance tubes. This combination of primary signals is applied to the primary elements of transposer 610.

Until the replaceable element 700 of the transposer is inserted into place, such combination of primary signals has no effect because the input circuits of the detector diodes are incomplete in the absence of that element. On the other hand, in the presence of the replaceable element the effect of the given combination of primary signals is determined by the circuitry or specifications of that element. For example, with the illustrative replaceable element of Figure 7 the first contact group 701—705 merely couples condensers 620 and 621 in parallel with the secondary inductors 619 and 621, respectively. Assuming that the inductors and condensers of detector 615—616 have equal values, this detector is not responsive to the combination of primary signals because the input circuit of diode 615 is then tuned to the same frequency as the input circuit of diode 616 and the output voltages developed in their load circuits cancel and annul one another.

The middle contact group 701*a*—705*a* of replaceable element 700, on the other hand, causes inductor 630 to be tuned by condenser 632 in parallel with condenser 706 carried by the replaceable element. At the same time, inductor 631 is tuned by condenser 633 in series with condenser 707 likewise carried on the replaceable element. By appropriate selection of condensers 706 and 707 one of the diodes of this detector is tuned to the nominal operating frequency of any particular one of the primary generators, such as generator 606, whereas the companion diode of that detector is tuned to the operating frequency of that same generator as modified by its reactance tube 606*a*. Consequently, any signal component of the combination of primary signal having a frequency $f_2$ produces an output pulse at terminal 641 of this detector of one polarity where as any signal energy of the frequency $f_2$ plus (or minus) $\Delta f$ produces an output pulse at the same terminal but of opposite polarity.

The final contact group included in replaceable element 700 leaves the circuits of condensers 636 and 637 open and tunes secondary inductors 634 and 635 wholly by condensers 708 and 709 carried on the replaceable element. Preferably, they tune one diode of this detector to the nominal operating frequency of a chosen one of the primary signal generators and tune the companion diode to the modified operating frequency of the same generator when its reactance tube or modulator is effective. The tuning of this detector results in an output pulse at terminal 642 of positive or negative polarity depending upon the presence in the combination of primary signals of components occurring at the nominal operating frequency of the selected generator or at its modified frequency.

The pulses thus made available at output terminals 640, 641 and 642 of transposer 610 may be employed to effect a determination of mode on the basis of bi-polarity code information or, as in the embodiment shown, they may be selected on the basis of polarity and utilized after that selection to actuate multivibrator 248 of Figure 2. The diodes 242, 243, 244, and 245 through which the output terminals of transposer 610 connect to the multivibrator respond to pulses of negative polarity but not to pulses of positive polarity and, therefore, introduce a selection of pulses on the basis of polarity. The actuation of the multivibrator develops a deflection-control signal for application to coder 12 of Figure 1 in the manner described in connection with the operation of the transmitter of Figures 1 and 2. Of course, where the modified structure of Figure 6 is substituted at the transmitter, a similar substitution is required at subscriber receivers to permit their utilization of the coded subscription telescast.

The replaceable element of Figure 7 may complete a variety of circuit connections to the detector as already described and may render it exceedingly difficult for an unauthorized user to break the coding arrangement of the system. If desired, the several detectors of transposer 610 may, in the absence of replaceable element 700, be tuned so that the diode of one detector responds to the nominal operating frequency of a primary generator while the companion diode of the same detector responds to the modified frequency of that generator imposed by its reactance tube. In such a case, the inserted card may change the tuning so that both diodes in the presence of the card are tuned to the same frequency which then effectively disables that detector. Alternatively, it may reverse the conditions of tuning to change the tuning of the diode previously responsive to the nominal operating frequency of the selected primary generator to the modified operating frequency of the same generator and vice versa. A change of this type inverts the polarity of the pulses otherwise obtained at the associated output terminal of that detector.

It has been convenient in the representation of Figure 6 to omit the counterpart of the reset generator 47 usually and preferably included in the transmitter. It, of course, may be added to the arrangement of Figure 6 as a substantial duplication of the reset arrangement included in Figures 1 and 2.

Thus, this invention has provided a subscription television system which assures maximum freedom from pirating with a minimum of complexity and cost. Further, the transposing element described herein possesses the desirable features of ease of merchandizing and freedom from easy duplication.

We claim:

1. In a subscription television system: an encoding mechanism having a plurality of operating conditions each of which imposes a different operating mode upon said system and responsive to applied signals to shift from one such operating condition to another; means for deriving at least one primary encoding signal; a transposer coupled between said signal-deriving means and said encoding mechanism for determining the response of said mechanism to said primary signal, said transposer including at least one primary input element and a plurality of secondary input elements spaced from, and normally having a predetermined circuit relationship with respect to, said one primary input element for translating said primary signal to a predetermined one of said secondary input elements to effect a preselected response of said mechanism to said primary signal and a panel mamber insertably disposed between said primary and secondary input elements and in functional relation with respect to said transposer and comprising circuit components coupled to said primary and secondary elements for modifying said circuit relationship of such elements to effectively translate said primary signal to another one of said secondary input elements to vary the response of said mechanism to said signal.

2. In a subscription television system: an encoding mechanism having a plurality of operating conditions each of which imposes a different operating mode upon said system and responsive to applied signals to shift from one such operating condition to another; means for deriving at least one primary encoding signal; a transposer coupled between said signal-deriving means and said encoding mechanism for determining the response of said mechanism to said primary signal, said transposer including a plurality of primary input elements and a plurality of secondary input elements normally having a predetermined circuit relationship with respect to one another for translating said primary signal to a predetermined one of said secondary input elements to effect a preselected response of said mechanism to said primary signal; and a transposing element removably disposed in functional relation with respect to said transposer and comprising circuit components coupled to selected ones of said primary and secondary elements for modifying said circuit relationship of such elements to effectively translate said primary signal to another one of said secondary input elements to vary the response of said mechanism to said signal.

3. In a subscription television system: an encoding mechanism having a plurality of operating conditions each of which imposes a different operating mode upon said system and responsive to applied signals to shift from one such operating condition to another; means for deriving at least one primary encoding signal; a transposer coupled between said signal-deriving means and said encoding mechanism for determining the response of said mechanism to said primary signal, said transposer including a plurality of primary input inductors and a plurality of secondary input inductors normally having a predetermined coupling with respect to one another and establishing a preselected response of said mechanism to said primary signal; and a transposing element removably disposed in functional relation with respect to said transposer and comprising circuit components coupled to selected ones of said primary and secondary elements to modify said coupling of such elements so that said primary signal as translated by said transposer to said encoding mechanism establishes a different preselected response of said mechanism to said signal.

4. In a subscription television system: an encoding mechanism having a plurality of operating conditions each of which imposes a different operating mode upon said system and responsive to applied signals to shift from one such operating condition to another; means for deriving at least one primary encoding signal; a transposer couplid between said signal-deriving means and said encoding mechanism for determining the response of said mechanism to said primary signal, said transposer including a plurality of primary input elements and a plurality of secondary input elements normally having a predetermined circuit relationship with respect to one another and establishing a preselected response of said mechanism to said primary signal; and a transposing element removably disposed in functional relation with respect to said transposer and comprising reactive coupling impedances interposed between selected ones of said primary and secondary elements to effect further coupling therebetween so that said primary signal as translated by said transposer to said encoding mechanism establishes a different preselected response of said mechanism to said signal.

5. In a subscription television system: an encoding mechanism having a plurality of operating conditions each of which imposes a different operating mode upon said system and responsive to applied signals to shift from one such operating condition to another; means for deriving at least one primary encoding signal of a particular frequency; a transposer coupled between said signal-deriving means and said encoding mechanism for determining the response of said mechanism to said primary signal, said transposer including at least one primary input element and at least one secondary input element spaced from, and normally having a predetermined circuit relationship with respect to, said one primary input element and establishing a preselected response of said mechanism to said primary signal; and a panel member insertably disposed between said primary and secondary input elements and in functional relation with respect to said transposer and comprising a reactive impedance coupled to one of said input elements to tune said one element to a preselected frequency and modify the response of said mechanism to said signal.

6. In a subscription television system: an encoding mechanism having a plurality of operating conditions each of which imposes a different operating mode upon said system and responsive to applied signals to shift from one such operating condition to another; means for deriving at least one primary encoding signal; a transposer coupled between said signal-deriving means and said encoding mechanism for determining the response of said mechanism to said primary signal, said transposer including at least one primary input element and at least one tuned secondary input element normally having a predetermined selectivity with respect to said primary signal and establishing a preselected response of said mechanism to said primary signal; and a transposing element removably disposed in functional relation with respect to said transposer and comprising a reactive impedance coupled to said tuned secondary element to vary the selectivity thereof so that said primary signal as translated by said transposer to said encoding mechanism establishes a different preselected response of said mechanism to said signal.

7. In a subscription television system: an encoding mechanism having a plurality of operating conditions each of which imposes a different operating mode upon said system and responsive to applied signals to shift from one such operating condition to another; means for deriving at least one primary encoding signal; a transposer coupled between said signal-deriving means and said encoding mechanism for determining the response of said mechanism to said primary signal, said transposer including at least one primary input inductor and at least one secondary input inductor normally having a predetermined mutual coupling and establishing a preselected response of said mechanism to said primary signal; and a transposing element removably disposed in functional relation with respect to said transposer and comprising a shield disposed between and shielding said elements from one another to prevent effective transfer of said primary signal from said primary to said secondary elements.

8. In a subscription television system: an encoding mechanism having a plurality of operating conditions each of which imposes a different operating mode upon said system and responsive to applied signals to shift from one such operating condition to another; means for deriving at least one primary encoding signal; a transposer coupled between said signal-deriving means and said encoding mechanism for determining the response of said mechanism to said primary signal, said transposer including a primary input element and a plurality of secondary input elements spaced from said primary input element and individually coupled to said encoding mechanism for translating said primary signal to a predetermined one of said secondary input elements to effect a preselected response of said mechanism to said primary signal; and a panel member insertably disposed between said primary and secondary input elements and in functional relation with respect to said transposer and comprising a coupling network selectively coupling said primary element to particular ones of said secondary elements to effect transfer of said primary signal to another one of said secondary input elements to vary the response of said mechanism and determine the effective operating mode of said system.

9. In a subscription television system: an encoding mechanism having a plurality of operating conditions each of which imposes a different operating mode upon said system and responsive to applied signals to shift from one such operating condition to another; means for deriving at least one primary signal having a frequency within a given range of frequencies; a transposer coupled between said signal-deriving means and said encoding mechanism for determining the response of said mechanism to said primary signal, said transposer including at least one discriminator-detector having a preselected response to signals within said range of frequencies; and a transposing element removably disposed in functional relation with respect to said transposer and comprising circuit components coupled to said discriminator-detector to modify the response thereof to signals within said range of frequencies so that said primary signal as translated by said transposer to said encoding mechanism establishes a preselected response of said mechanism to said signal.

10. In a subscription television system: an encoding mechanism having a plurality of operating conditions each of which imposes a different operating mode upon said system and responsive to applied signals to shift from one such operating condition to another; means for deriving at least one primary signal having a frequency within a given range of frequencies; a transposer coupled between said signal-deriving means and said encoding mechanism for determining the response of said mechanism to said primary signal, said transposer including at least one discriminator-detector; and a transposing element removably disposed in functional relation with respect to said transposer and comprising circuit components coupled to said discriminator-detector to establish a predetermined response thereof to signals within said range of frequencies so that said primary signal as translated by said transposer to said encoding mechanism establishes a preselected response of said mechanism to said signal.

References Cited in the file of this patent

UNITED STATES PATENTS

| | | |
|---|---|---|
| 2,226,508 | Clothier et al. | Dec. 24, 1940 |
| 2,402,058 | Loughren | June 11, 1946 |
| 2,437,255 | Hogan et al. | Mar. 9, 1948 |
| 2,501,274 | Hamilton | Mar. 21, 1950 |
| 2,526,694 | Samet | Oct. 24, 1950 |
| 2,539,556 | Steinberg | Jan. 30, 1951 |
| 2,656,407 | Herrick et al. | Oct. 20, 1953 |

FOREIGN PATENTS

| | | |
|---|---|---|
| 986,834 | France | Apr. 4, 1951 |